United States Patent
Brunn et al.

(10) Patent No.: US 7,460,848 B1
(45) Date of Patent: Dec. 2, 2008

(54) DIFFERENTIAL SIGNAL STRENGTH DETECTOR

(75) Inventors: Brian T. Brunn, Austin, TX (US); Jinghui Lu, Austin, TX (US)

(73) Assignee: Xilinx, Inc., San Jose, CA (US)

(*) Notice: Subject to any disclaimer, the term of this patent is extended or adjusted under 35 U.S.C. 154(b) by 671 days.

(21) Appl. No.: 10/955,062

(22) Filed: Sep. 29, 2004

(51) Int. Cl.
*H04B 17/00* (2006.01)
*H03K 5/153* (2006.01)

(52) U.S. Cl. .................. 455/226.2; 327/77

(58) Field of Classification Search ............ 455/226.1, 455/226.2, 226.4, 230; 327/50, 77, 78
See application file for complete search history.

(56) References Cited

U.S. PATENT DOCUMENTS

| | | | | |
|---|---|---|---|---|
| 3,731,203 A | * | 5/1973 | Lieberman | .......... 725/148 |
| 5,414,774 A | * | 5/1995 | Yumoto | ............. 381/1 |
| 5,479,160 A | * | 12/1995 | Koelle | ........... 340/10.4 |
| 2002/0067838 A1 | * | 6/2002 | Kindred et al. | ....... 381/104 |
| 2005/0036571 A1 | * | 2/2005 | Shvodian et al. | ....... 375/316 |
| 2005/0231285 A1 | * | 10/2005 | Takasawa et al. | ...... 330/278 |

OTHER PUBLICATIONS

U.S. Appl. No. 10/683,944, filed Oct. 10, 2003, Young.

* cited by examiner

*Primary Examiner*—Nguyen Vo
(74) *Attorney, Agent, or Firm*—Timothy W. Markison; Justin Liu

(57) ABSTRACT

A signal detection circuit includes a first signal multiplier operably coupled to square an input signal, a second signal multiplier operably coupled to square a reference signal, and a filter module operably coupled to produce a digital output representative of the input signal based on a squared input signal and a squared reference signal.

26 Claims, 9 Drawing Sheets signal detection circuit 26 programmable logic device 10

MGT 20 signal detection circuit 26 signal detection waveforms signal detection circuit 26 first and second signal multiplier 40 & 42 signal detection circuit 26 signal detection circuit 26

DIFFERENTIAL SIGNAL STRENGTH DETECTOR

FIELD OF THE INVENTION

This invention relates generally to data communications and more particularly to differential signal strength detectors used therein.

DESCRIPTION OF RELATED ART

Communication systems are known to transport large amounts of data between a plurality of end user devices, which, for example, include telephones, facsimile machines, computers, television sets, cellular telephones, personal digital assistants, etc. As is also known, such communication systems may be local area networks (LANs) and/or wide area networks (WANs) that are stand-alone communication systems or interconnected to other LANs and/or WANs as part of a public switched telephone network (PSTN), packet switched data network (PSDN), integrated service digital network (ISDN), the Internet, etc. As is further known, communication systems include a plurality of system equipment to facilitate the transporting of data. Such system equipment includes, but is not limited to, routers, switches, bridges, gateways, protocol converters, frame relays, private branch exchanges, etc.

The transportation of data within communication systems is typically governed by one or more standards that ensure the integrity of data conveyances and fairness of access for data conveyances. For example, there are a variety of Ethernet standards that govern serial transmissions within a communication system at data rates of 10 megabits per second, 100 megabits per second, 1 gigabit per second and beyond. Another standard, which is for fiber optic data conveyances, is Synchronous Optical NETwork (SONET) that provides a data rate of 10 gigabits per second. In accordance with such standards, many system components and end user devices of a communication system transport data via serial transmission paths. Internally, however, the system components and end user devices process data in a parallel manner. As such, each system component and end user device must receive the serial data and convert the serial data into parallel data without loss of information.

Accurate recovery of information from high-speed serial transmissions typically requires transceiver components to operate at clock rates that are equal to or higher than the rate of the received serial data, which, for today's high-speed systems, requires very high clock rates. Such high clock rates limit the usefulness of prior art signal detection circuits since such signal detection circuits lack the sensitivity to accurately detect the low voltage levels of the high-speed serial data and also presents a significant load on the signal lines. In addition, prior art signal detection circuits properties vary significantly with today's integrated circuit (IC) fabrication techniques since the properties of the components of the signal detection circuit vary over temperature, supply voltage, and/or IC fabrication process.

Therefore, a need exists for a differential signal strength detector that operates at high speeds and may be implemented using today's IC fabrication techniques with less susceptibility to the above mentioned limitations.

BRIEF SUMMARY OF THE INVENTION

The differential signal strength detector of the present invention substantially meets these needs and others. In one embodiment of the present invention, a signal detection circuit includes a first signal multiplier, a second signal multiplier, and a filter module. The first signal multiplier is operably coupled to square an input signal to produce a squared input signal. The second signal multiplier is operably coupled to square a reference signal to produce a squared reference signal. The filter module is operably coupled to produce a digital output representative of the input signal based on the squared input signal and the squared reference signal.

In another embodiment of the invention, a signal detection circuit includes a first rectifying module, a second rectifying module, a combining module, and a filter module. The first rectifying module is operably coupled to rectify the input signal to produce a rectified input signal. The second rectifying module is operably coupled to rectify a reference signal to produce a rectified reference signal. The combining module is operably coupled to combine the rectified input signal and the rectified reference signal to produce a combined signal. The filtering module is operably coupled to filter the combined signal to produce a digital value representation of the input signal.

DETAILED DESCRIPTION OF THE INVENTION

Figure 1:
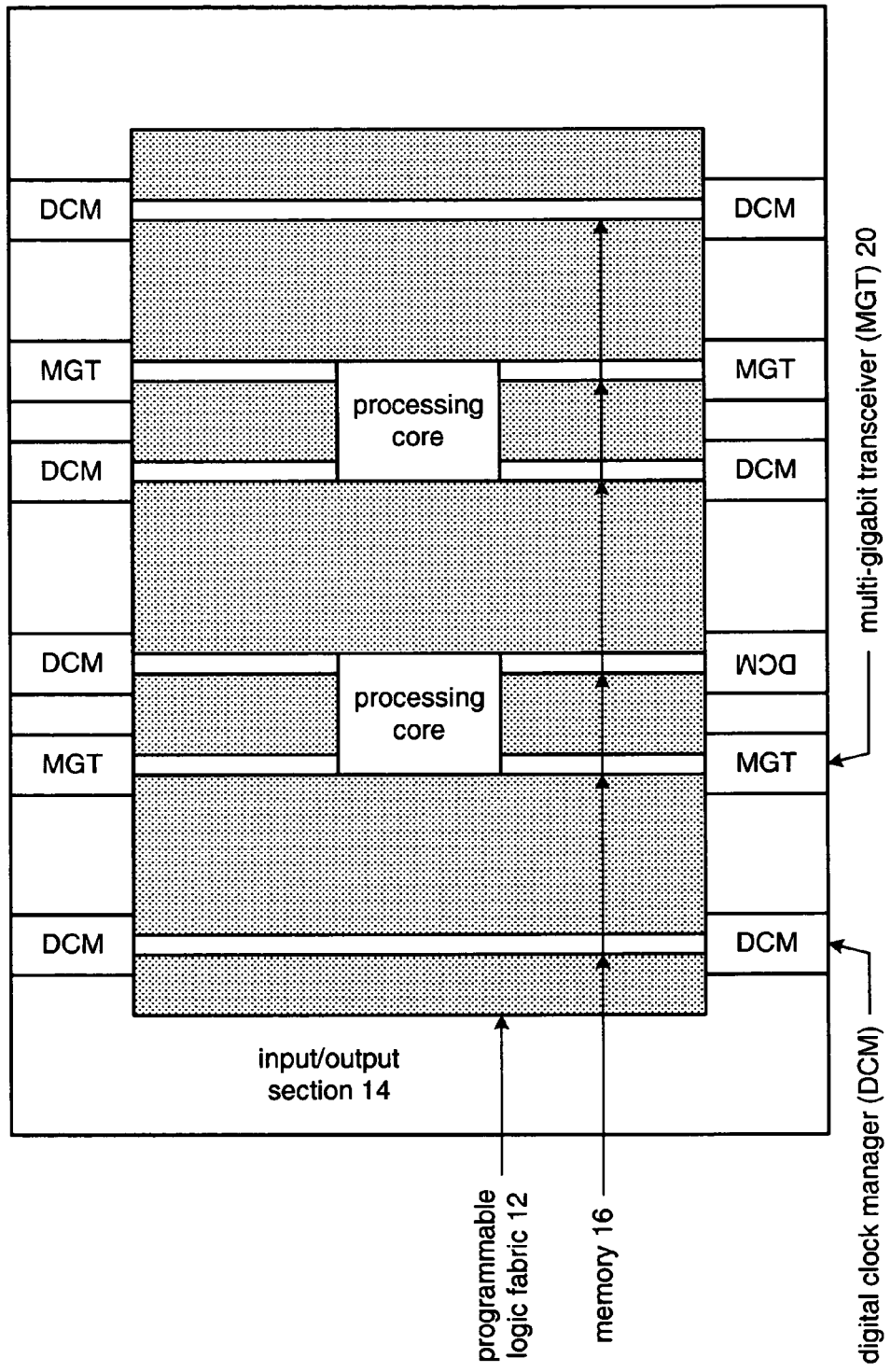
FIG. 1 is a schematic block diagram of a programmable logic device in accordance with the present invention.

FIG. 1 is a schematic block diagram of a programmable logic device 10 that includes programmable logic fabric 12, an input/output section 14, and memory 16. The programmable logic fabric 12 may include one or more processing cores and programmable logic circuitry. Such programmable logic circuitry may include programmable logic arrays (PLAs), programmable array logic (PAL) devices, erasable programmable logic devices (EPLDs), complex programmable logic devices (CPLDs) and/or programmable gate arrays (PGAs), such as field programmable gate arrays (FPGAs). Memory 16 may be block random access memory (BRAM). Input/output section 14 may include a plurality of digital clock managers (DCMs) and a plurality of multi-gigabit transceivers (MGTs). Other programmable logic devices may include other resources, such as processors, digital signal processing blocks, and multipliers, and may have alternate arrangements. One such alternate arrangement is described in co-pending U.S. patent application Ser. No. 10/683,944 by Young, entitled "Columnar Architecture", which is incorporated herein by reference in its entirety.

The digital clock managers provide various clock signals to the programmable logic fabric 12 and may further provide clock signals to the multi-gigabit transceivers. The multi-gigabit transceivers provide digital interfaces for the programmable logic fabric 12 to exchange data with components external to the programmable logic device 10. In general, the multi-gigabit transceivers provide serial-to-parallel conversion of received serial data and provide parallel-to-serial conversion for outgoing data. The MGTs may include signal detection circuitry to detect the presence of the received serial data and to enable the receiver section within the MGT. Further, the digital clock managers may, for example, provide clock signals to memory, or other input/output modules, for double data rate and quad data rate accesses. Note that while some embodiments described herein may relate to programmable logic devices such as FPGAs, other embodiments may include other types of devices or integrated circuits having high-speed transceivers.

Figure 2:
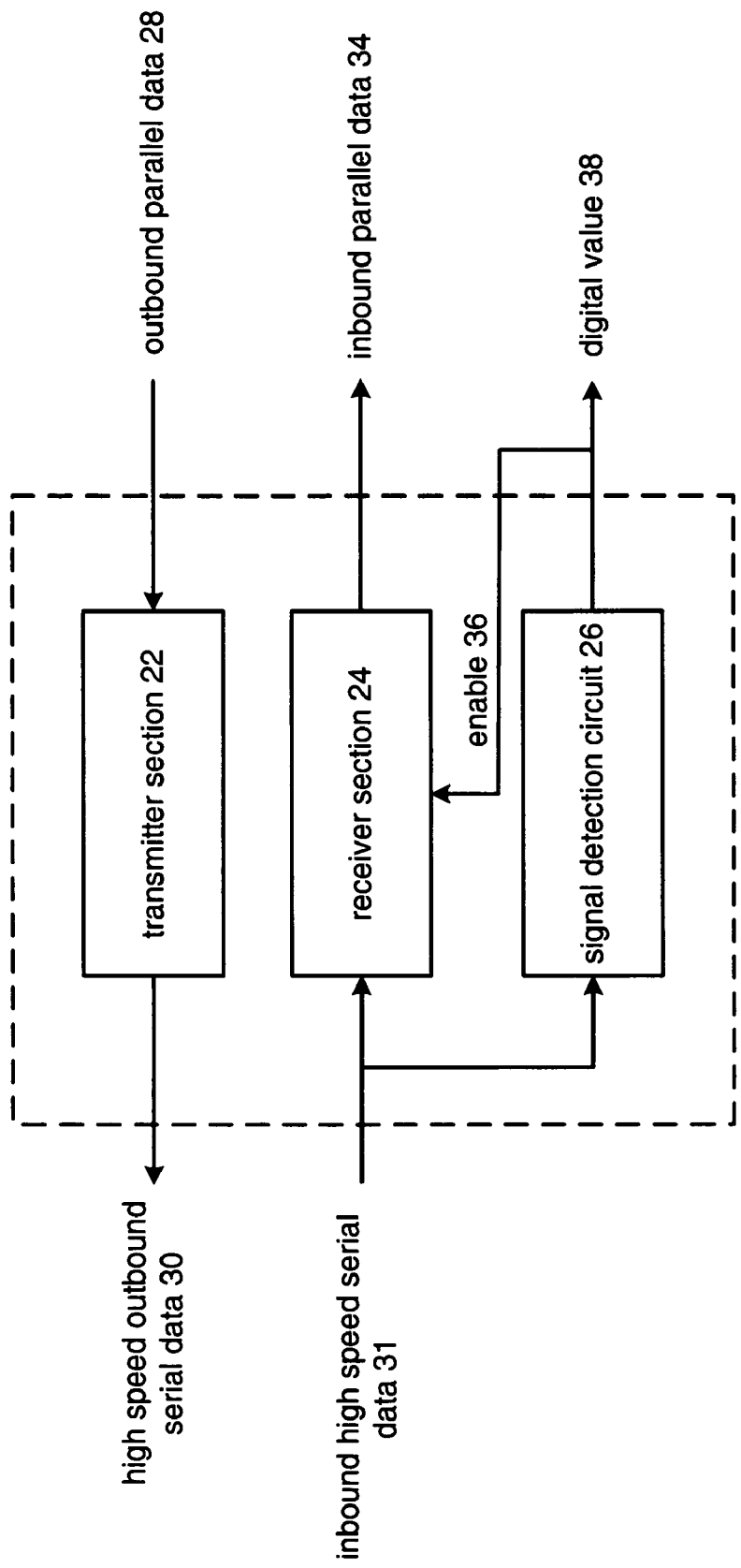
FIG. 2 is a schematic block diagram of a multi-gigabit transceiver in accordance with the present invention.

FIG. 2 is a schematic block diagram of a multi-gigabit transceiver (MGT) that includes a transmitter section 22, a receiver section 24, and a signal detection circuit 26. In operation, the MGT receives outbound parallel data 28 from the programmable logic fabric (e.g., programmable logic fabric 12 of FIG. 1), memory (memory 16 of FIG. 1), or other source, and converts it into high-speed outbound serial data 30. To facilitate the parallel-to-serial conversion, transmitter section 22, which may include an elastic store buffer, receives parallel-to-serial settings from the processing core, for example to indicate the width of outbound parallel data 28 and the data rate of the parallel data. Based on the parallel-to-serial settings, and at least one transmit clock, transmitter section 22 produces high-speed outbound serial data 30 from outbound parallel data 28.

The MGT 20 also receives inbound high-speed serial data 31 from a source external to programmable logic device 10 and converts it into inbound parallel data 34. Receiver section 24, when enabled by enable 36, receives inbound high-speed serial data 31, and based on serial-to-parallel settings received from the processing core, produces the inbound parallel data 34 to downstream components. The received serial-to-parallel settings may include the data rate and data width of the inbound parallel data 34.

A signal detection circuit 26 is operably coupled to at least partially assist in enabling receiver section 24 when the presence of inbound high-speed serial data 31 is detected. Signal detection circuit 26 generally functions to produce a digital value 38 representative of the inbound high-speed serial data 31. The operation of signal detection circuit 26 will be more fully described in the following figures.

Figure 3:
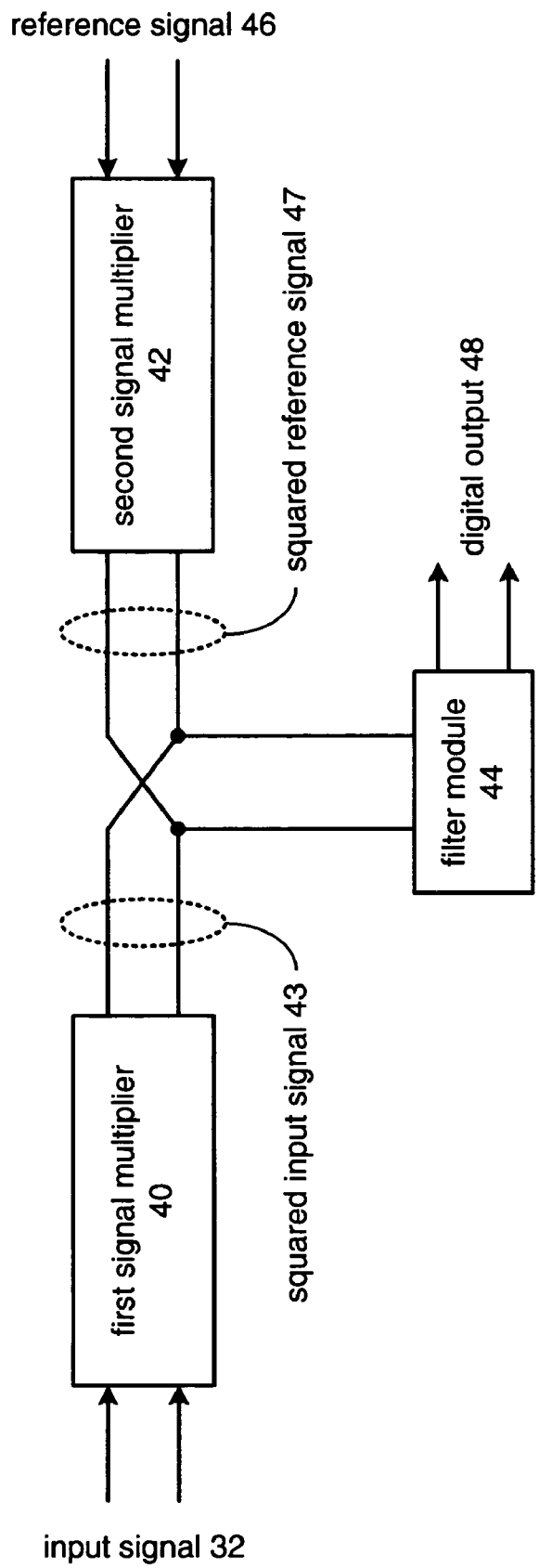
FIG. 3 is a schematic block diagram of a signal detection circuit in accordance with the present invention.

FIG. 3 is a schematic block diagram of signal detection circuit 26 according to one embodiment of the present invention. Signal detection circuit 26 includes a first signal multiplier 40, a second signal multiplier 42, and a filter module 44.

First signal multiplier 40 is operably coupled to receive input signal 32, which may represent the inbound high-speed serial data 31. Second signal multiplier 42 is operably coupled to receive a reference signal 46. First signal multiplier 40 produces a squared input signal 43 based on input signal 32, while second signal multiplier 42 produces a squared reference signal 47 based on reference signal 46. Filter module 44 is operably coupled to a produce digital output 48 that represents the input signal based on the squared input signal and the squared reference signal.

As can be seen in FIG. 3, the output of the second signal multiplier 42 is cross-coupled to the output of first signal multiplier 40, wherein squared input signal 43 is effectively biased by squared reference signal 47. Filter module 44 is operably coupled to the cross-coupled outputs of the first and second signal multipliers such that when squared input signal 43 is filtered by filter module 44, digital output 48 represents input signal 32 as a logic 1 when a magnitude of squared input signal 43 is a first threshold level above squared reference signal 47 and is a logic 0 when the magnitude of squared input signal 43 is a second threshold level below squared reference signal 47. Digital output 48 produced from filter module 44 is a digital representation of input signal 32 and includes at least one of a digital value representing the presence of input signal 32 and a corresponding digital value of input signal 32.

Input signal 32 may include one of an out-of-band signal, a Serial Advanced Technology Attachment (S-ATA) bus signal, and a Peripheral Component Interconnect Express (PCI-X) bus signal. PCI-X and S-ATA use serial differential low-voltage signals in point-to-point high-speed serial communications. The topology consists of a differential transmitter connected through an AC coupled differential pair to a differential receiver. In-band signaling consists of differential signals where a voltage level greater than a first level represents a logic one and a voltage level less than a second level represents a logic zero. Out-of-band signaling employs differential signals where the temporal spacing between adjacent differential signals is used to wake up or shut down high-power circuits to conserve power. This is especially advantageous in battery-operated devices.

Although shown as a differential circuit, one of average skill in the art should recognize that signal detection circuit 26 may be implemented in a single-ended configuration.

Figure 4:
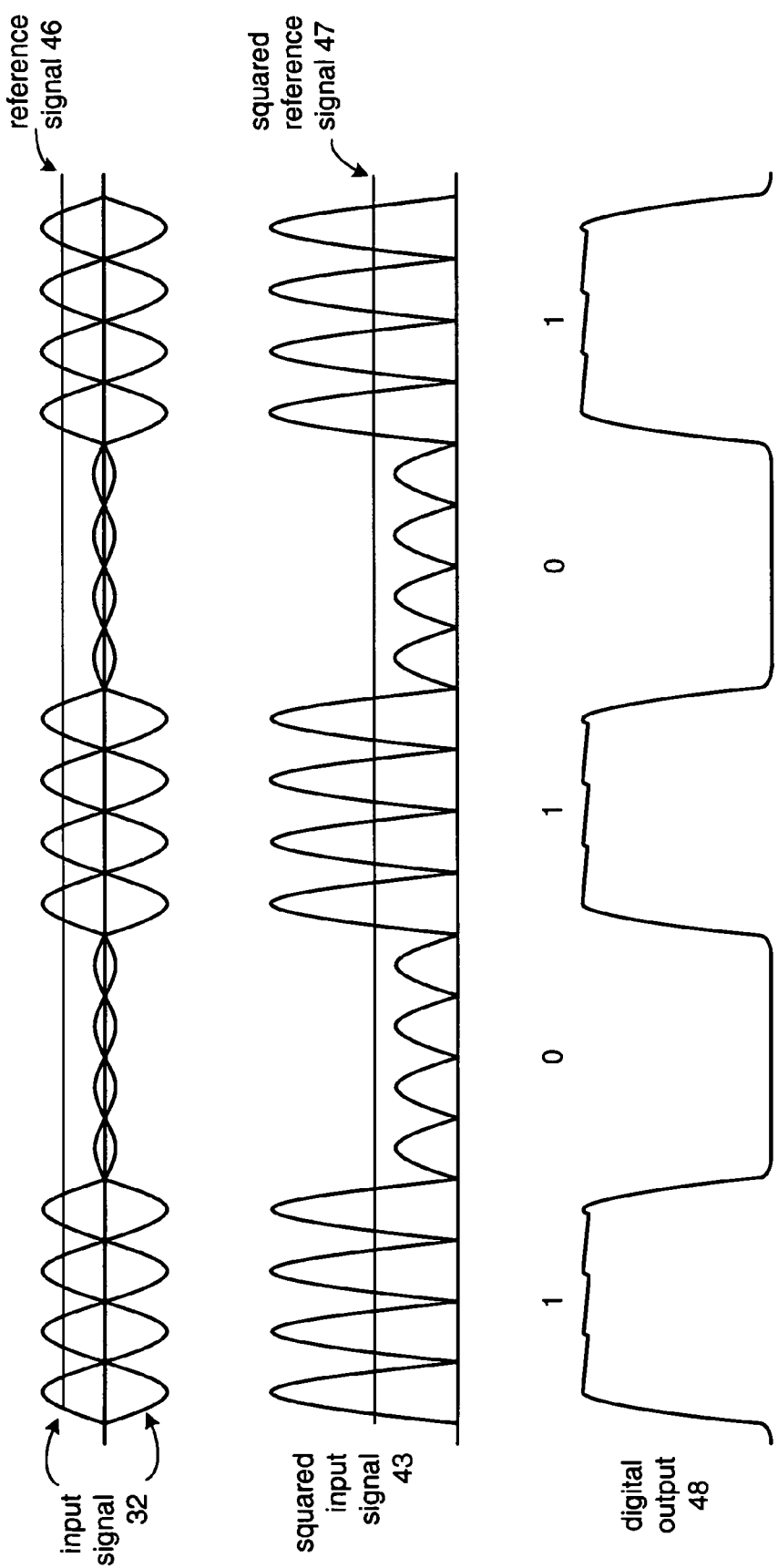
FIG. 4 is a diagram of waveforms of a signal detection circuit in accordance with the present invention.

FIG. 4 illustrates signal detection waveforms of signal detection circuit 26. Input signal 32, received as inbound high-speed serial data 31, is a low voltage differential signal. Reference signal 46 is received as a DC signal having a reference level above the AC ground of input signal 32. In the second illustration of FIG. 4, input signal 32 has been squared or rectified by first signal multiplier 40 to produce squared input signal 43. Reference signal 46 has been squared or rectified by second signal multiplier 42 to produce squared reference signal 47. The squaring function of first signal multiplier 40 removes the negative-going components of input signal 32 to produce only positive-going components as is known by one of average skill in the art.

Squared reference signal 47 effectively sets an AC ground between the low-level signals representing a digital 0 and the high-level signals representing a digital 1. Squared reference signal 47 is used to detect the presence of the input signal and also to detect the digital value of the input signal. This is illustrated in the third portion of FIG. 4 wherein digital output 48 represents the filtered squared input signal 43. Digital output 48 represents a logic 1 when the magnitude of squared input signal 43 is a first threshold level above squared reference signal 47 and is a logic 0 when the magnitude of squared input signal 43 is a second threshold level below squared reference signal 47.

Figure 5:
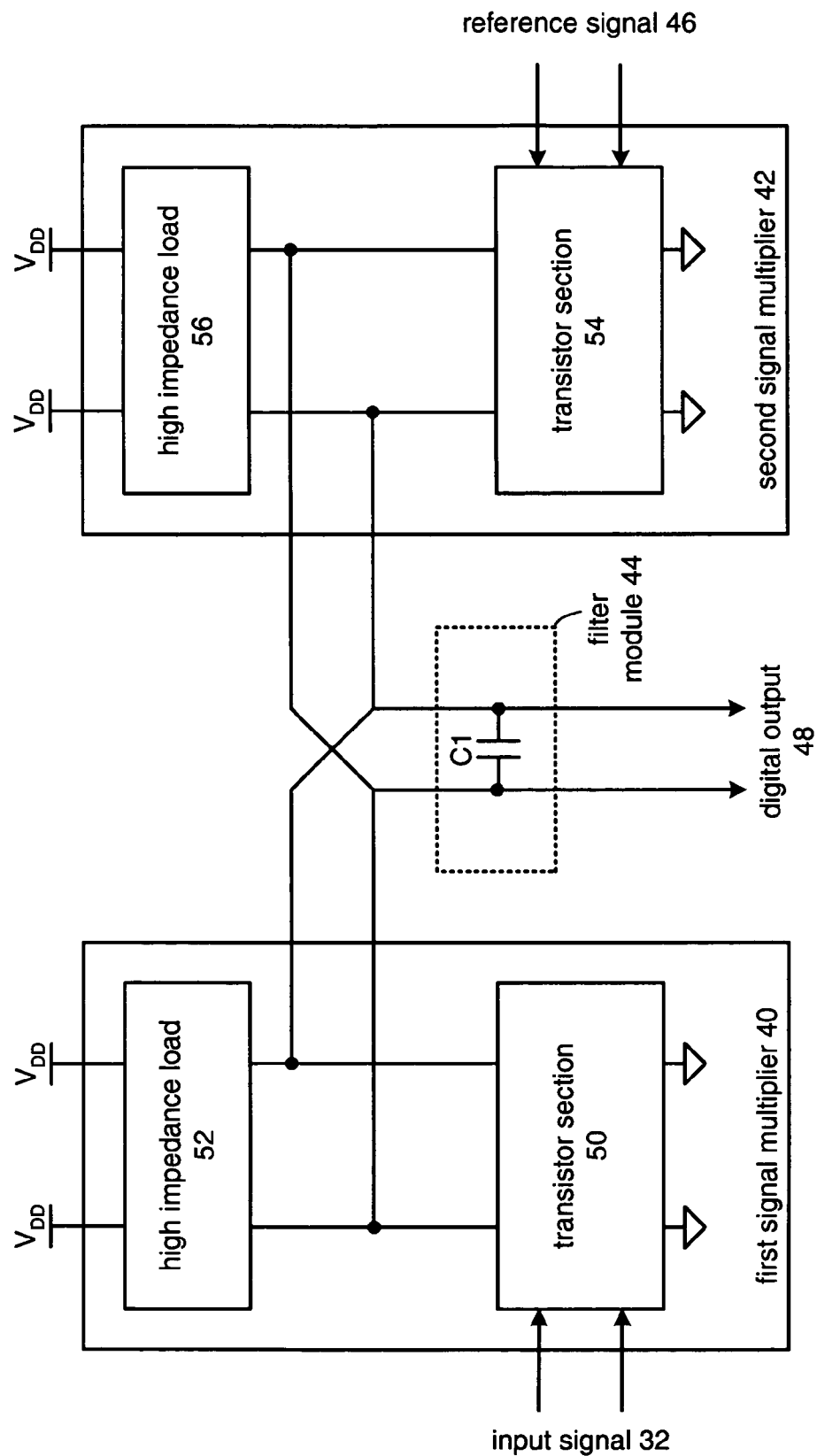
FIG. 5 is a schematic block diagram of a signal detection circuit in accordance with the present invention.

FIG. 5 is a schematic block diagram of another embodiment of signal detection circuit 26 that includes first signal multiplier 40, second signal multiplier 42, and filter module 44. First signal multiplier 40, configured as a Gilbert cell multiplier, includes transistor section 50 and high impedance load 52. Second signal multiplier 42, configured as a Gilbert cell multiplier, includes transistor section 54 and high impedance load 56. Filter module 44 includes capacitor C1.

In operation, first signal multiplier 40 receives input signal 32 representing the inbound high-speed serial data. Transistor section 50, operating as a transconductance amplifier, converts input signal 32 into a squared input current operably coupled to high impedance load 52 to produce the squared input signal. The squared input signal is operably coupled to filter module 44.

Transistor section 54 of second signal multiplier 42, operating as a transconductance amplifier, converts reference signal 46 into a squared reference current operably coupled to high impedance load 56 to produce the squared reference signal. The squared reference signal cross-coupled with the squared input signal at the input filter module 44 effectively sets an AC ground for the squared input signal. In the cross-coupled configuration, a positive leg of the squared input signal is operably coupled to a negative leg of the squared reference signal and a negative leg of the squared input signal operably coupled to a positive leg of the squared reference signal.

Capacitor C1 of filter module 44 in combination with the high impedance loads of first signal multiplier 40 and second signal multiplier 42 establishes the filtering characteristics of filtering module 44. Digital output 48 produced from filter module 44 is a digital representation of input signal 32 and further indicates the presence of the input signal. Digital output 48 is a logic one when a magnitude of the squared input signal is a first threshold level above the squared reference signal and is a logic zero when the magnitude of the squared input signal is a second threshold level below the squared reference signal.

Figure 6:
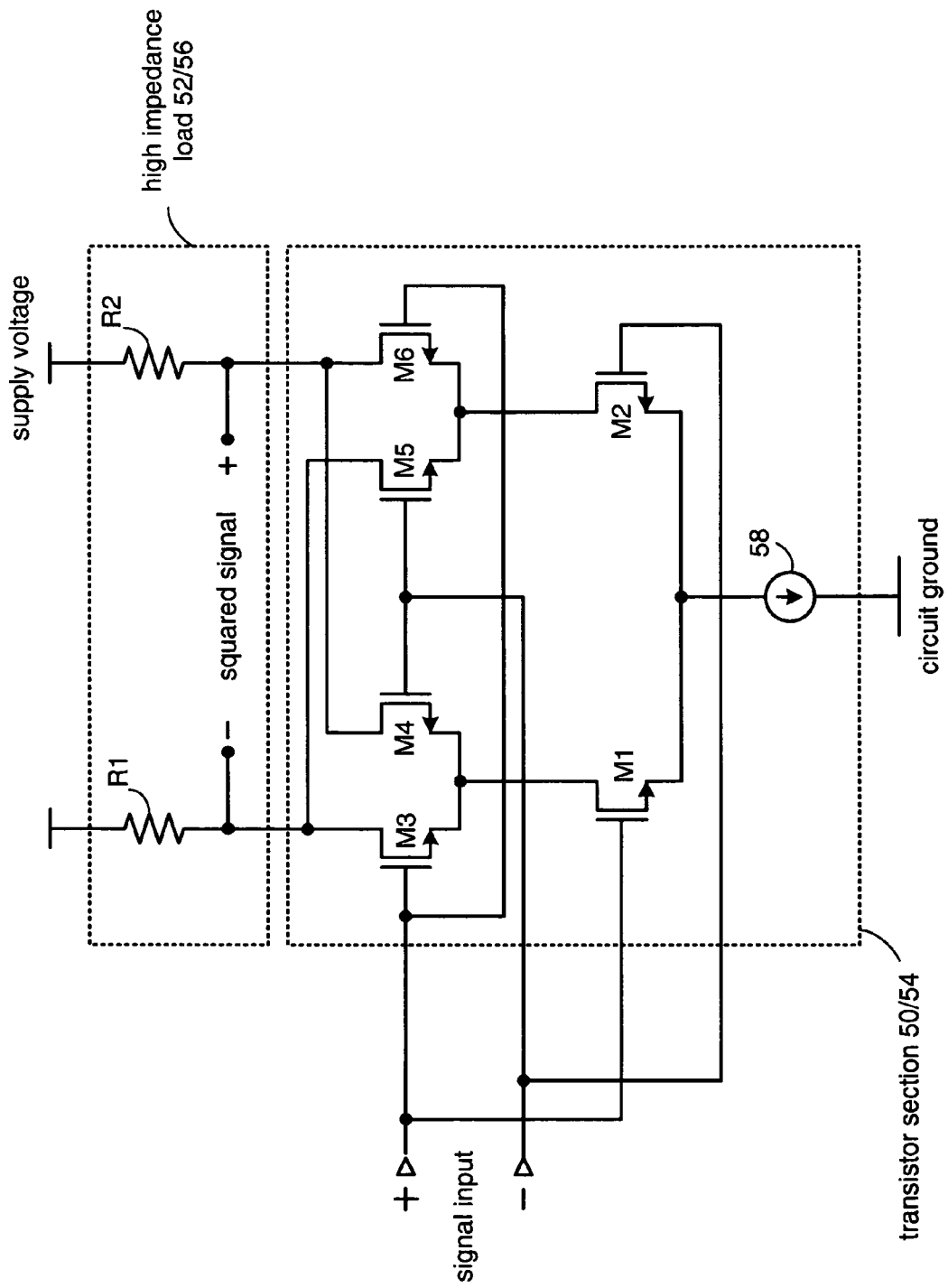
FIG. 6 is a schematic diagram of signal multiplier in accordance with the present invention.

FIG. 6 is a schematic diagram of one of first signal multiplier 40 and second signal multiplier 42. The signal multiplier includes a transistor section 50 or 54 and a high impedance load 52 or 56 including resistive elements R1 and R2. The transistor section 50 or 54 includes a pair of input transistors, namely transistor M1 and transistor M2, a first differential pair including transistors M3 and M4, a second differential pair including transistors M5 and M6, and a current source 58.

In operation, a signal input representing one of input signal 32 or reference signal 46 is operably coupled to input transistors M1 and M2, the first differential pair, and the second differential pair. One of average skill in the art will recognize the signal multiplier as a Gilbert cell multiplier. The signal input is converted to an input current by input transistors M1 and M2 and the current from transistors M1 and M2 is operably coupled as a bias current to the first differential pair and the second differential pair. The signal input coupled to the first differential pair and second differential pair is converted to a current wherein the conversion gain or transconductance is a function of the bias current which is the converted input current of the input transistors.

The current from the input transistors is multiplied by the current from one of the first differential pair and the second differential pair. Since the input to the pair of input transistors and the first and second differential pair is the same signal, the signal input is multiplied by itself, or squared, to produce a squared input current to the high impedance load coupled to the output of the Gilbert cell multiplier to produce the squared signal representing one of the squared input signal and the squared reference signal. By using a high impedance load, a required voltage swing is produced by a relatively small current produced by the Gilbert cell multiplier, thereby keeping circuit devices relatively small which substantially reduces device parasitics and noise.

Figure 7:
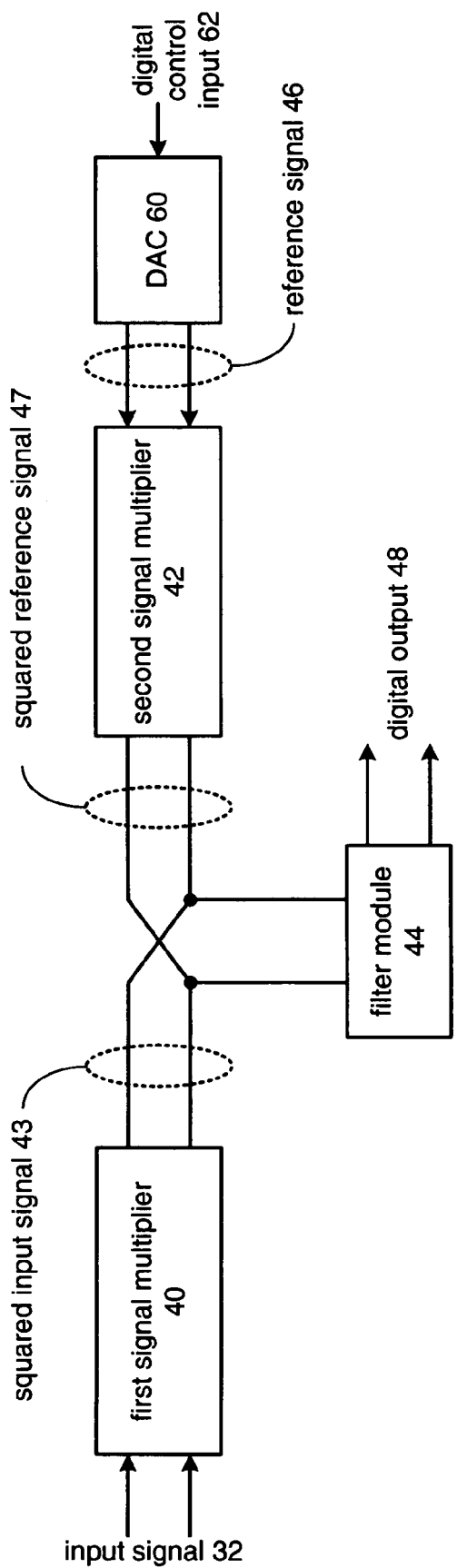
FIG. 7 is a schematic block diagram of a signal detection circuit in accordance with the present invention.

FIG. 7 is a schematic block diagram of another embodiment of signal detection circuit 26 that includes a first signal multiplier 40, a second signal multiplier 42, a digital-to-analog converter (DAC) 60, and a filter module 44.

First signal multiplier 40 is operably coupled to input signal 32 representing inbound high-speed serial data. Second signal multiplier 42 is operably coupled to DAC 60. First signal multiplier 40 produces a squared input signal 43 based on input signal 32, while second signal multiplier 42 produces a squared reference signal 47 based on reference signal 46. DAC 60 produces reference signal 46 based on digital control input 62 which may be a variable input. Filter module 44 is operably coupled to a produce digital output 48 representative of input signal 32 based on squared input signal 43 and squared reference signal 47.

As can be seen in FIG. 7, the output of the second signal multiplier 42 is cross-coupled to the output of first signal multiplier 40, wherein squared input signal 43 is effectively biased to squared reference signal 47. Filter module 44 is operably coupled to the cross-coupled outputs of the first and second signal multipliers such that when squared input signal 43 is filtered by filter module 44, digital output 48 represents input signal 32 as a logic 1 when a magnitude of squared input signal 43 is a first threshold level above squared reference signal 47 and is a logic 0 when the magnitude of squared input signal 43 is a second threshold level below squared reference signal 47. Digital output 48 is a digital representation of input signal 32 and includes at least one of a digital value representing the presence of input signal 32 and a corresponding digital value of input signal 32.

Figure 8:
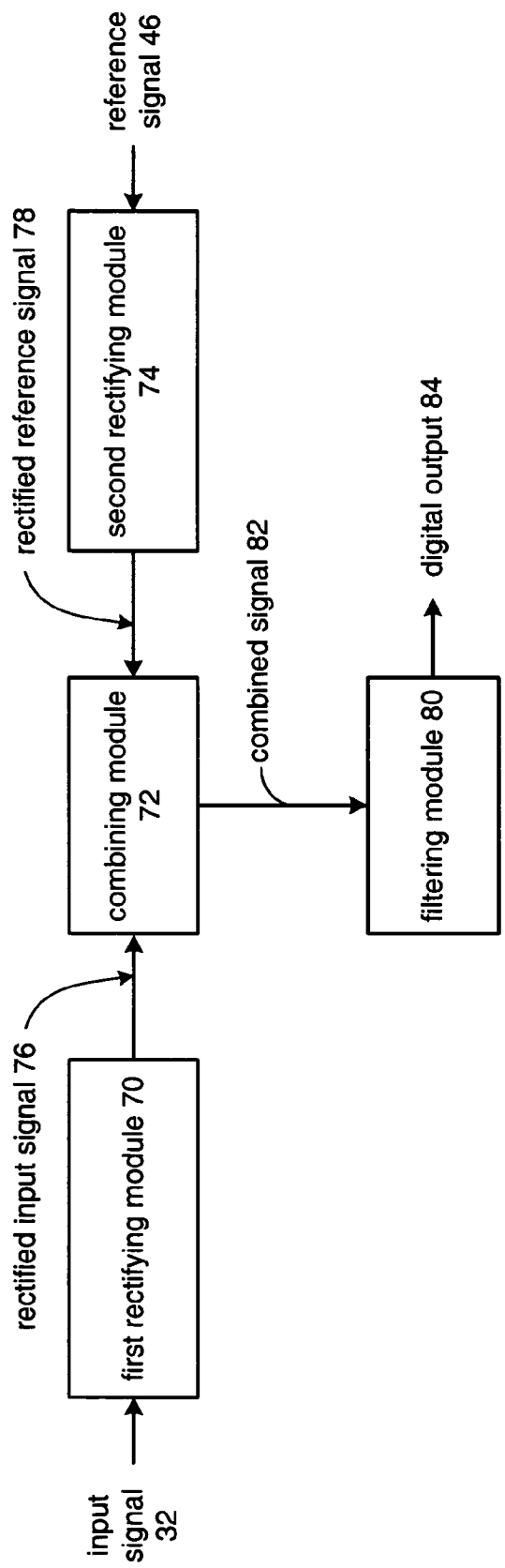
FIG. 8 is a schematic block diagram of another a signal detection circuit in accordance with the present invention.

FIG. 8 is a schematic block diagram of an embodiment of signaling detection circuit 26 that includes a first rectifying module 70 operably coupled to rectify input signal 32 to produce rectified signal 76, a second rectifying module 74 operably coupled to rectify reference signal 46 to produce rectified reference signal 78, and a combining module 72 operably coupled to combine the rectified input signal 76 and the rectified reference signal 78 to produce a combined signal 82. Filtering module 80 is operably coupled to produce digital output 84 based on combined signal 82.

Each of the first and second rectifying modules includes a Gilbert cell multiplier for squaring the input signal 32 to produce rectified input signal 76 and for squaring reference signal 46 to produce rectified reference signal 78. Signal detection circuit 26 may further include a digital-to-analog converter (DAC) operably coupled to produce reference signal 46 based on a digital control input (not shown). The digital control input coupled to the DAC includes one of a fixed and a variable input.

Combining module 72 includes a positive leg of rectified input signal 76 operably coupled to a negative leg of rectified reference signal 78 and a negative leg of rectified input signal 76 operably coupled to a positive leg of rectified reference signal 78 to produce the cross-coupled connection. Filtering module 80 includes a capacitor operably coupled to filter combined signal 82 to produce a logic 1 when a magnitude of rectified input signal 76 is a first threshold above rectified reference signal 78 and to produce a logic 0 when the magnitude of rectified input signal 78 is a second threshold level below rectified reference signal 78.

Figure 9:
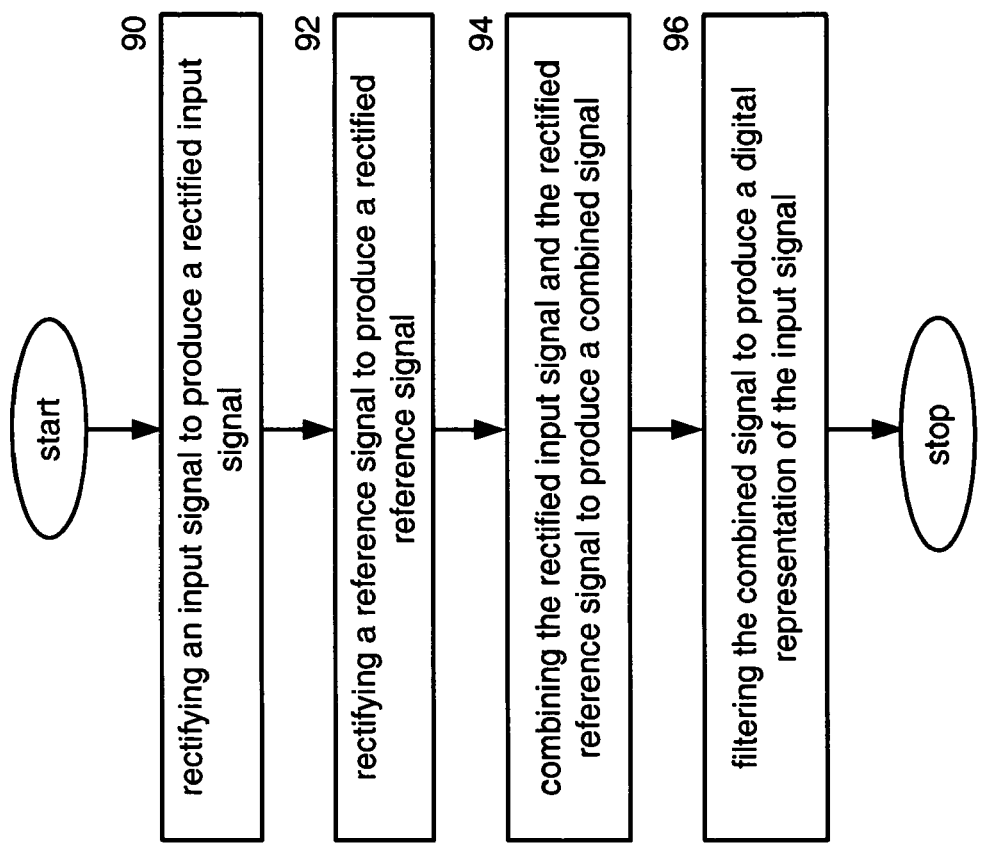
FIG. 9 is a flowchart for a method for signal detection in accordance with the present invention.

FIG. 9 is a flow chart for a method for signal detection. The method includes rectifying an input signal to produce a rectified input signal (step 90) and rectifying a reference signal to produce a rectified reference signal (step 92). Using Gilbert cell multipliers, the input signal may be squared to produce the rectified input signal and the reference signal is squared to produce the rectified reference signal. The reference signal may be produced by converting a digital-to-analog converter (DAC) based on a variable digital control input.

Thereafter, the method combines the rectified input signal and the rectified reference signal to produce a combined signal (step 94). The step of combining includes coupling a positive leg of the rectified input signal to a negative leg of the rectified reference signal and coupling a negative leg of the rectified input signal to a positive leg of the rectified reference signal. The cross-coupling of the rectified input signal and rectified reference signal functions to set the rectified reference signal as an "AC ground" for determining a relative magnitude of the rectified input signal.

The combined signal is filtered to produce a digital representation of the input signal (step 96). The step of filtering includes filtering the combined signal to produce a logic one when a magnitude of the rectified input signal is a first threshold level above the rectified reference signal and filtering the combined signal to produce a logic zero when the magnitude of the rectified input signal is a second threshold level below the rectified reference signal. The logic one further indicates the detection of the input signal and the digital value of digital control input represents the magnitude of the input signal.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Specific embodiments of the present invention have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A signal detection circuit comprises:
    a first signal multiplier operably coupled to square an input signal to produce a squared input signal;
    a second signal multiplier operably coupled to square a reference signal to produce a squared reference signal; and
    a filter module operably coupled to produce a digital output representative of the input signal based on the squared input signal and the squared reference signal,
        wherein each of the first signal multiplier and the second signal multiplier include a transistor section operably coupled to receive the input signal or the reference signal, and a high impedance load operably coupled to the transistor section to provide an output.

2. The signal detection circuit of claim 1, wherein each of the first and second signal multipliers comprises a Gilbert cell multiplier.

3. The signal detection circuit of claim 2, wherein the filter module comprises a capacitor operably coupled to the output of each of the Gilbert cell multipliers, and wherein the capacitor in combination with the high impedance load of the Gilbert cell multipliers establish filtering characteristics of the filtering module.

4. The signal detection circuit of claim 1 wherein:
    output of the second signal multiplier is cross-coupled to output of the first signal multiplier, wherein the squared input signal is effectively biased to the squared reference signal such that when the squared input signal is filtered by the filtering module the digital output representing the input signal is a logic one when a magnitude of the squared input signal is a first threshold level above the squared reference signal and is a logic zero when the magnitude of the squared input signal is a second threshold level below the squared reference signal.

5. The signal detection circuit of claim 1, further comprises a digital-to-analog converter (DAC) operably coupled to produce the reference signal based on a digital control input.

6. The signal detection circuit of claim 5, wherein the digital control input comprises a variable input.

7. The signal detection circuit of claim 1, wherein the input signal comprises at least one of an out-of-band signal, a Serial Advanced Technology Attachment (S-ATA) bus signal and a Peripheral Component Interconnect Express (PCI-X) bus signal.

8. The signal detection circuit of claim 1, wherein the digital output representative of the input signal comprises at least one of a digital value representing presence of the input signal and a corresponding digital value of the input signal.

9. A method for signal detection comprises:
    rectifying an input signal to produce a rectified input signal;
    rectifying a reference signal to produce a rectified reference signal;
    combining the rectified input signal and the rectified reference signal to produce a combined signal;
    filtering the combined signal to produce a digital representation of the input signal;
    coupling a positive leg of the rectified input signal to a negative leg of the rectified reference signal; and
    coupling a negative leg of the rectified input signal to a positive leg of the rectified reference signal.

10. The method of claim 9 wherein:
    rectifying the input signal comprises squaring the input signal to produce the rectified input signal; and
    rectifying the reference signal comprises squaring the reference signal to produce the rectified reference signal.

11. The method of claim 10 further comprises:
    converting a digital control input into the reference signal, wherein the reference signal is an analog signal, and wherein the reference signal is produced by a digital-to-analog converter (DAC) based on a digital control input.

12. The method of claim 11 further comprises varying the digital control input to vary the reference signal.

13. The method of claim 9 wherein the filtering comprises:
    filtering the combined signal to produce a logic one when a magnitude of the rectified input signal is a first threshold level above the rectified reference signal; and
    filtering the combined signal to produce a logic zero when the magnitude of the rectified input signal is a second threshold level below the rectified reference signal.

14. A multi-gigabit transceiver (MGT) comprises:

a transmitter section operably coupled to convert outbound parallel data into high speed outbound serial data;

a receiver section, when enabled, operably coupled to convert inbound high speed serial data into inbound parallel data; and a signal detection circuit operably coupled to enable the receiver section when presence of a signal is detected, wherein the signal detection circuit includes:

a first signal multiplier operably coupled to square an input signal to produce a squared input signal, wherein at least a portion of the input signal corresponds to the inbound high speed serial data;

a second signal multiplier operably coupled to square a reference signal to produce a squared reference signal; and a filter module operably coupled to produce an indication of signal detection based on the squared input signal and the squared reference signal, wherein each of the first and second signal multipliers include a transistor section operably coupled to receive the input signal or the reference signal, and a high impedance load operably coupled to the transistor section to provide an output.

15. The multi-gigabit transceiver of claim 14 wherein each of the first and second signal multipliers comprises a Gilbert cell multiplier.

16. The multi-gigabit transceiver of claim 15 wherein the filter module comprises a capacitor operably coupled to the output of each of the Gilbert cell multipliers, and wherein the capacitor in combination with the high impedance load of the Gilbert cell multipliers establishes filtering characteristics of the filtering module.

17. The multi-gigabit transceiver of claim 14 wherein:

output of the second signal multiplier is cross-coupled to output of the first signal multiplier, wherein the squared input signal is effectively biased to the squared reference signal such that when the squared input signal is filtered by the filtering module a digital value representing the input signal is a logic one when a magnitude of the squared input signal is a first threshold level above the squared reference signal and is a logic zero when the magnitude of the squared input signal is a second threshold level below the squared reference signal.

18. The multi-gigabit transceiver of claim 14, wherein the signal detection circuit further comprises a digital-to-analog converter (DAC) operably coupled to produce the reference signal based on a digital control input.

19. The multi-gigabit transceiver of claim 18 wherein the DAC digital control input comprises a variable input.

20. The multi-gigabit transceiver of claim 14 wherein the input signal comprises at least one of an out-of-band signal, a S-ATA bus signal and a PCI express bus signal.

21. The multi-gigabit transceiver of claim 14, wherein the signal detection circuit further functions to produce a digital value representative of the input signal.

22. A signal detection circuit comprises:

a first rectifying module operably coupled to rectify the input signal to produce a rectified input signal;

a second rectifying module operably coupled to rectify a reference signal to produce a rectified reference signal;

a combining module operably coupled to combine the rectified input signal and the rectified reference signal to produce a combined signal; and a filtering module operably coupled to filter the combined signal to produce a digital value representation of the input signal, wherein the filter module includes a capacitor operably coupled to filter the combined signal to produce a logic one when a magnitude of the rectified input signal is a first threshold level above the rectified reference signal and to produce a logic zero when the magnitude of the rectified input signal is a second threshold level below the rectified reference signal.

23. The signal detection circuit of claim 22, wherein the first rectifying module comprises a first Gilbert cell multiplier for squaring the input signal to produce the rectified input signal and the second rectifying module comprises a second Gilbert cell multiplier for squaring the reference signal to produce the rectified reference signal.

24. The signal detection circuit of claim 23, further comprises a digital-to-analog converter (DAC) operably coupled to produce the reference signal based on a digital control input.

25. The signal detection circuit of claim 24, wherein the digital control input comprises a variable input.

26. The signal detection circuit of claim 22, wherein the combining module comprises:

a positive leg of the rectified input signal operably coupled to a negative leg of the rectified reference signal; and a negative leg of the rectified input signal operably coupled to a positive leg of the rectified reference signal.

\* \* \* \* \*